United States Patent
Schrepfer (10) Patent No.: US 10,000,155 B2
(45) Date of Patent: Jun. 19, 2018

(54) METHOD AND DEVICE FOR REPRODUCING A LATERAL AND/OR REAR SURROUNDING AREA OF A VEHICLE

(71) Applicant: Application Solutions (Electronics and Vision) Ltd., Lewes (GB)

(72) Inventor: Joerg Schrepfer, Tettau (DE)

(73) Assignee: Application Solutions (Electronics and Vision) Ltd., Lewes (GB)

( * ) Notice: Subject to any disclaimer, the term of this patent is extended or adjusted under 35 U.S.C. 154(b) by 199 days.

(21) Appl. No.: 14/906,329

(22) PCT Filed: Jul. 1, 2014

(86) PCT No.: PCT/EP2014/063960
§ 371 (c)(1),
(2) Date: Jan. 20, 2016

(87) PCT Pub. No.: WO2015/010861
PCT Pub. Date: Jan. 29, 2015

(65) Prior Publication Data
US 2016/0167583 A1    Jun. 16, 2016

(30) Foreign Application Priority Data
Jul. 23, 2013    (DE) .......... 10 2013 214 368

(51) Int. Cl.
*B60R 1/00*    (2006.01)
*B60R 11/04*    (2006.01)

(52) U.S. Cl.
CPC ........... *B60R 1/00* (2013.01); *B60R 11/04* (2013.01); *B60R 2300/306* (2013.01);
(Continued)

(58) Field of Classification Search
CPC ..................... B60Q 1/00; H04N 7/18
See application file for complete search history.

(56) References Cited

U.S. PATENT DOCUMENTS

| | | |
|---|---|---|
| 4,279,328 A | 7/1981 | Ahlbom |
| 5,102,089 A | 4/1992 | Baur |

(Continued)

FOREIGN PATENT DOCUMENTS

| | | |
|---|---|---|
| DE | 199 36 578 | 3/2001 |
| DE | 100 37 128 | 5/2001 |

(Continued)

OTHER PUBLICATIONS

International Search Report of the International Searching Authority for International Application PCT/EP2014/063960, dated Sep. 18, 2014, 2 pages, European Patent Office, HV Rijswijk, Netherlands.

(Continued)

*Primary Examiner* — Frank Huang
(74) *Attorney, Agent, or Firm* — W. F. Fasse (57) ABSTRACT

A method and a device are for detecting and reproducing a lateral and/or rear surrounding area of a vehicle with a trailer, so that the driver can monitor the surrounding area. The surrounding area is detected by at least one image capturing device which produces image data of the surrounding area. The image data is reproduced by at least one image reproducing device arranged in a field of vision of the vehicle driver. A characteristic of the reproduced image section is adapted dependent on an alignment of the trailer relative to the vehicle.

19 Claims, 3 Drawing Sheets

(52) U.S. Cl.
CPC ..... *B60R 2300/307* (2013.01); *B60R 2300/70* (2013.01); *B60R 2300/802* (2013.01); *B60R 2300/806* (2013.01); *B60R 2300/808* (2013.01)

(56) References Cited

U.S. PATENT DOCUMENTS

| | | | |
|---|---|---|---|
| 5,119,241 | A | 6/1992 | Rutten |
| 6,178,650 | B1 | 1/2001 | Thibodeaux |
| 6,198,409 | B1 * | 3/2001 | Schofield .................. B60R 1/12 280/728.1 |
| 6,392,315 | B1 * | 5/2002 | Jones ....................... F02P 3/053 123/597 |
| 6,720,920 | B2 * | 4/2004 | Breed ................... B60N 2/2863 342/357.31 |
| 6,930,592 | B2 | 8/2005 | Schlecht et al. |
| 7,079,017 | B2 * | 7/2006 | Lang ....................... G01S 15/931 340/435 |
| 7,579,940 | B2 * | 8/2009 | Schofield ................ B60C 23/00 340/425.5 |
| 7,974,444 | B2 | 7/2011 | Hongo |
| 8,947,532 | B2 | 2/2015 | Augst |
| 2002/0167589 | A1 * | 11/2002 | Schofield ............. G08G 1/0175 348/135 |
| 2005/0134983 | A1 * | 6/2005 | Lynam ....................... B60R 1/12 359/872 |
| 2005/0238203 | A1 | 10/2005 | Yoshimura |
| 2006/0164230 | A1 | 7/2006 | DeWind et al. |
| 2006/0178787 | A1 | 8/2006 | McCall |
| 2006/0287826 | A1 | 12/2006 | Shimizu et al. |
| 2007/0073473 | A1 * | 3/2007 | Altan .................... G01S 13/726 701/518 |
| 2007/0181810 | A1 * | 8/2007 | Tan ....................... G01S 7/4811 250/341.1 |
| 2008/0077882 | A1 | 3/2008 | Kramer et al. |
| 2008/0231701 | A1 | 9/2008 | Greenwood et al. |
| 2008/0288104 | A1 | 11/2008 | Shani |
| 2009/0091436 | A1 | 4/2009 | Anderson |
| 2009/0102921 | A1 | 4/2009 | Ito et al. |
| 2012/0083960 | A1 | 4/2012 | Zhu et al. |
| 2012/0229639 | A1 | 9/2012 | Singleton |
| 2013/0054086 | A1 | 2/2013 | Lo et al. |
| 2013/0076007 | A1 | 3/2013 | Goode et al. |
| 2013/0120579 | A1 | 5/2013 | Mlitsuta et al. |
| 2013/0215270 | A1 | 8/2013 | Murashita et al. |
| 2013/0322692 | A1 | 12/2013 | Guan |
| 2014/0293052 | A1 | 10/2014 | Kuehnle et al. |
| 2015/0022665 | A1 | 1/2015 | Lu |
| 2015/0066349 | A1 | 3/2015 | Chan et al. |
| 2016/0167583 | A1 | 6/2016 | Schrepfer |
| 2016/0288710 | A1 | 10/2016 | Brandi et al. |
| 2016/0314357 | A1 | 10/2016 | Fey et al. |
| 2017/0232893 | A1 | 8/2017 | Ebner et al. |

FOREIGN PATENT DOCUMENTS

| | | |
|---|---|---|
| DE | 100 65 230 | 7/2002 |
| DE | 101 54 612 | 5/2003 |
| DE | 103 05 761 | 9/2004 |
| DE | 102004025252 | 12/2005 |
| DE | 102005045195 | 4/2006 |
| DE | 102005027846 | 12/2006 |
| DE | 102006036933 | 2/2008 |
| DE | 102006037600 | 2/2008 |
| DE | 102007032527 | 2/2008 |
| DE | 102008030104 | 2/2009 |
| DE | 102007044536 | 3/2009 |
| DE | 102008046214 | 4/2009 |
| DE | 102006037600 B4 | 3/2010 |
| DE | 102008045436 | 3/2010 |
| DE | 102009032542 | 1/2011 |
| DE | 102010026222 | 5/2011 |
| DE | 102009057837 | 6/2011 |
| DE | 102011077143 | 12/2012 |
| DE | 102012010126 | 12/2012 |
| DE | 102011113197 | 3/2013 |
| DE | 102012006206 | 10/2013 |
| EP | 1 158 473 | 11/2001 |
| EP | 2 028 632 | 2/2009 |
| EP | 2 312 497 | 4/2011 |
| EP | 2 431 227 | 3/2012 |
| GB | 2 447 672 | 9/2008 |
| JP | 2001-310679 A | 11/2001 |
| JP | 2003-235036 A | 8/2003 |
| JP | 2004-001658 A | 1/2004 |
| JP | 2005-306266 A | 11/2005 |
| JP | 2008-077628 A | 4/2008 |
| JP | 2010-234859 A | 10/2010 |
| KR | 20120044752 | 5/2012 |
| KR | 20120115716 | 10/2012 |
| WO | WO 88/04619 | 6/1988 |
| WO | WO 2013/009697 | 1/2013 |
| WO | WO 2013/079068 | 6/2013 |

OTHER PUBLICATIONS

PCT International Preliminary Report on Patentability including English Translation of PCT Written Opinion of the International Searching Authority for International Application PCT/EP2014/063960, dated Jan. 26, 2016, 10 pages, International Bureau of WIPO, Geneva, Switzerland.

German Search Report for German Patent Application No. 10 2013 214 368.0, dated May 22, 2014, 7 pages, Muenchen, Germany, with English translation, 5 pages.

European Office Action in European Patent Application No. 14 736 718.9, dated May 23, 2017, 5 pages, with partial English translation, 2 pages.

Partial English translation of Japanese Office Action in Japanese Patent Application No. 2016-528388, dated Feb. 21, 2018, 2 pages.

* cited by examiner

METHOD AND DEVICE FOR REPRODUCING A LATERAL AND/OR REAR SURROUNDING AREA OF A VEHICLE

FIELD OF THE INVENTION

The invention relates to a method and a device for reproducing a lateral and/or rear surrounding area of a vehicle, in particular by means of at least one image capturing device and at least one image reproducing device, as well as in particular as a mirror replacement.

BACKGROUND INFORMATION

Vehicles such as passenger cars and trucks are equipped as standard with exterior and interior mirrors which are also known as side mirrors and rearview mirrors. The mirrors help the vehicle driver to monitor the lateral and rear surrounding area of the vehicle, for example when reversing, parking, changing lanes or turning.

It has already been recognized that the exterior and interior mirrors currently used have several disadvantages. The mirrors usually only provide the vehicle driver with a very limited viewing angle of the vehicle surroundings. So-called "blind spots" can only be compensated for by means of additional or aspherical mirrors. The known exterior and interior mirrors can only be used with difficulty or cannot be used at all in the dark. In addition, the headlights of a following vehicle, for example, can cause dazzling effects. Another disadvantage is the fact that the vehicle driver is temporarily distracted from what is happening in the traffic each time that the vehicle driver's eyes have to adapt to the modified object distances when glancing at one of the mirrors, i.e. during the so-called accommodation of the eyes. Another major disadvantage of exterior mirrors which should be indicated is their negative influence on the design and aerodynamic properties of the vehicle, in particular on the latter's flow resistance.

Due to the various disadvantages of the known exterior and interior mirrors, approaches already exist which replace the mirrors by a system which comprises one or more image capturing devices, in particular cameras, which detect the lateral and/or rear surrounding area of the vehicle, and produce image data of the corresponding area as well as one or more image reproducing devices, for example display screens, wherein the image reproducing devices are arranged in the field of vision of the vehicle driver and which continually reproduce the image data which is generated by the image capturing device. The image capturing devices are generally arranged on the left and right sides respectively in the outer area of the vehicle, for example in the area of the A-pillar with a line of vision backwards. The image reproducing devices are mostly arranged in the inside of the vehicle, also in the area of the A-pillar respectively, in the field of vision of the vehicle driver.

DE 10 2007 044 536 A1 shows such a solution, in particular for monitoring the lateral and/or rear surroundings of a vehicle, comprising recording means for capturing an image flow containing the images of at least one part of the surroundings of the vehicle, a display unit for reproducing at least one image section of the image flow in the inside of the vehicle, and means for automatically modifying the surrounding section represented by the reproduction of the image section by means of the display unit. The solution also comprises means for determining at least one earlier position of the vehicle, wherein the surrounding section can be automatically adapted in accordance with the earlier position of the vehicle.

DE 10 2007 044 536 A1 thus discloses a solution for intelligent and situation-specific adaptation of the represented section of the vehicle surroundings, which is represented by the display unit. However, the document does not disclose a satisfactory solution for vehicles with trailers and, in particular, not for commercial vehicles such as, for example, trucks.

In the case of systems which replace the left and right exterior mirrors respectively by recording means and a display unit, it can occur, for example, that, as of a certain curve radius, the trailer of the vehicle is only visible on one side in the displayed image section, i.e. the vehicle surroundings are partially or completely obscured in the image by the front side of the trailer and that, on the opposite side, an image of the vehicle surroundings is displayed, without the trailer of the vehicle being visible therein. In such a case, it is difficult for the vehicle driver to monitor the vehicle surroundings sufficiently and to correctly judge the position of the trailer in the vehicle surroundings. Carrying out particularly complex driving manoeuvers with a trailer is therefore made difficult.

In order to ensure that, in the case of vehicles with trailers, the vehicle driver can also sufficiently monitor the vicinity of the vehicle at all times with different alignments of the trailer with respect to the vehicle, i.e. at different angles of the vehicle longitudinal axis to the trailer longitudinal axis, a particular field of vision, which is also described as a "Field of vision of Class IV wide-angle mirrors", which must likewise be visible at all times to the vehicle driver, i.e. with vehicle mirrors or with a camera-based mirror replacement system, is specified in an ISO (International Organization for Standardization) standard, in particular standard ISO 16505 in conjunction with ECE-R46 (Regulation No. 46 of the Economic Commission for Europe of the United Nations (UN/ECE)).

In the case of the known vehicle mirrors, the coverage of the prescribed "Class IV" field of vision is achieved in that the vehicle driver can freely move his head and is thus able to view the required field of vision by means of a relatively small mirror. In the case of the mirror replacement systems which are now proposed, which work with cameras and screens, it has to date only been possible to compensate for the relevant field of vision by correspondingly high resolutions and/or with large detection angles of the cameras, and by means of correspondingly large displays in the inside of the vehicle. In order for a screen which is intended to replace the right exterior mirror and which, on a vehicle in which the steering wheel is arranged on the left side of the vehicle, is to be arranged at a distance of up to 2 meters from the vehicle driver, a diameter of at least 32 inches would be required, for example, to cover the relevant field of vision. This conflicts with cost-saving and space-saving objectives and significantly influences the design of the inside of the vehicle.

SUMMARY OF THE INVENTION

It is therefore an object of the invention to indicate a solution for vehicles with trailers, with an improved specification of the image section of the vehicle surroundings represented by the image reproducing device. The aim is to provide a sufficiently large field of vision of the lateral and/or rear vehicle surroundings, in particular at relatively low expense, for example with a small screen size.

This object can be achieved by a method and a device having the features according to the invention as set forth herein. Advantageous embodiments and further developments of the invention are also disclosed, with combinations and further developments of individual features with one another also being possible.

A basic concept of at least one embodiment of the invention is to adapt the reproduction and/or the representation of the surrounding area, in particular the represented image section of the lateral and/or rear vehicle surroundings, to a determined alignment of the vehicle trailer. The alignment of the trailer is preferably continuously determined during travel and/or in certain driving situations. For example, the angle of the longitudinal axis of the trailer with respect to the longitudinal axis of the vehicle can be continuously determined. The adaptation can be carried out, in particular if the angle is known and the length and width of the trailer are known, such that the image of the surrounding area of the vehicle in the represented image section is, if possible, not obscured or is obscured as little as possible by the trailer of the vehicle. The adaptation is carried out in particular by selecting a suitable image section from an overall image, by altering the image ratio and/or by altering the image resolution.

The solution according to the invention can be used, in particular, for systems which replace the left and right side mirrors respectively by image capturing and image reproducing means. As a result, the vehicle driver has an adequate view of the lateral and/or rear surroundings of the vehicle at all times, particularly in the case of different alignments of the trailer, for example during cornering or during reversing manoeuvers.

The method according to the invention is used for detecting and/or for reproducing a lateral and/or rear surrounding area of a vehicle, in particular for monitoring and/or observing the surrounding area by the vehicle driver. The lateral and/or rear surrounding area is at least a sub-area of the area of the vehicle surroundings located on the left or right side, which area has been visible to date to the vehicle driver with the side and/or exterior mirrors used as standard on vehicles. The lateral and/or rear surrounding area is, in particular, at least a part of the field of vision which is defined in ECE-R46 and is designated a "Field of vision of class IV wide-angle mirrors". The method can, in particular, be used in mirror replacement systems for commercial vehicles such as trucks or even on passenger cars which are equipped with trailers.

Within the framework of the method according to the invention, the relevant surrounding area of the vehicle is detected by means of at least one image capturing device, i.e. the surrounding area which is to be displayed to the vehicle driver for monitoring, and image data of the surrounding area is produced. In addition, the image data which is generated by the at least one image capturing device is reproduced by means of at least one image reproducing device which is arranged in the field of vision of the vehicle driver.

If the method according to the invention is used for monitoring both the left and the right surrounding areas of the vehicle, then image data of the respective vehicle surroundings is produced in particular by means of image capturing devices arranged respectively on both sides of the vehicle. The image capturing devices arranged on both sides of the vehicle may be connected to joint image processing electronics which process the image data which is generated and, in particular, adapt the represented image sections in accordance with the method according to the invention. The image data can then be reproduced on a separate or a jointly used image reproducing device. In order to be able to detect a sufficiently large surrounding area and produce image data from the relevant surrounding area, more than just one image capturing device can also, in particular, be arranged on each side of the vehicle. The image data which is generated by the multiple image capturing devices can be combined to produce an overall image of the respective surrounding area. In addition, the image data from image capturing devices arranged on the sides of the vehicle can, for example, be combined with image data from an image capturing device arranged on the rear of the vehicle to produce an overall image.

According to the invention, the image section of the surrounding area represented during the reproduction of the image data is adapted as a function of a determined alignment of a trailer of the vehicle. The adaptation of the image section can thereby be understood, in particular, to denote the selection or alteration of a section and/or a sub-area of an overall image of the surrounding area detected and/or generated by means of the image capturing device. The selection and/or alteration preferably occur(s) in such a way that the vehicle driver can also monitor the surrounding area located to the side and rear of the vehicle and trailer, even in the case of different alignments of the trailer, in particular such that the surrounding area displayed in the represented image section is, if possible, not obscured or obscured as little as possible by the trailer of the vehicle.

The alignment of the trailer is preferably the location of the trailer relative to the vehicle. In particular, the angle of the longitudinal axis of the trailer with respect to the longitudinal axis of the vehicle, i.e. the articulation angle of the trailer longitudinal axis with respect to the vehicle longitudinal axis, can be determined. The exact location and position of the trailer with respect to the vehicle can optionally be determined based on the angle and on the basis of the known or determined length and/or width of said trailer.

The alignment of the trailer is determined, and the represented image section is adapted preferably continuously during travel and/or at least in certain driving situations, for example during reversing, parking and/or when changing lanes or during overtaking manoeuvers.

The alignment and/or the angle of the trailer with respect to the vehicle can be indicated, for example in degrees)(°), starting from the initial state during straight traveling. During straight traveling the articulation angle between the longitudinal axes of the vehicle and trailer, i.e. the angle between the axes measured around their pivot point, is 180°. The articulation angle becomes smaller as the curve radius becomes increasingly tight.

Within the framework of the method according to the invention, the image section represented during the reproduction of the image data is preferably adapted such that a represented image ratio is adapted and/or modified as a function of the determined alignment of the trailer. The represented image ratio can be understood, in particular, to mean the zoom ratio and/or the zoom factor of the representation of the surrounding area. For example, in the case of tight curve radii, i.e. in the case of a small articulation angle between the vehicle and trailer longitudinal axes, where a large part of the surrounding area is obscured by the trailer on one side of the vehicle, a smaller image ratio can be selected, i.e. it is possible to zoom out of the image, in order to provide the vehicle driver with a better and/or more comprehensive image of the area around the trailer. An increasingly reduced image ratio can, in particular, be selected in the case of an articulation angle which is getting smaller, for example, in the steps 1:9, 1:10, 1:11, etc., i.e. it is possible to zoom all the further out of the representation of the surrounding area, the tighter a curve is, in order to continue to provide the vehicle driver with a sufficient overview of the surrounding area of the vehicle.

In addition, within the framework of the method according to the invention, an image resolution is preferably adapted as a function of the determined alignment of the trailer. Both the resolution, by means of which the image capturing device detects and produces the image data of the lateral and/or rear surrounding area, and/or the resolution, in which the image data and/or the selected image section is/are represented by means of the image reproducing device, can be adapted as a function of the determined alignment of the trailer. The image resolution can, in particular, also be adapted as a function of the adaptation of the image ratio described previously.

According to one particular embodiment of the method according to the invention, the image section represented during the reproduction of the image data can be adapted, in particular, such that when a reversing manoeuvre is detected the image ratio is increased and the represented image section is adapted as a function of the alignment of the trailer, such that the represented image section always shows at least a rear end of the trailer. The adaptation is also preferably carried out such that the trailer and/or the rear end of the trailer, in the image section represented on the image reproducing device, is/are only located in a defined edge area. This embodiment of the method according to the invention is, in particular, used so that the vehicle driver, on reversing, for example when parking or during a reversing manoeuvre with a trailer, is provided with a representation of the surrounding area aligned to the rear end of the trailer, so that he can better detect objects and/or obstacles which are in the immediate vicinity, and can better estimate the distance of the objects from the trailer. An edge area of the entire image representation area of the image reproducing device is preferably defined, in Which the trailer and/or the rear end of the trailer is/are displayed, wherein the remaining image representation area is preferably not obscured by the trailer, but shows the area of the vehicle surroundings of interest and located at the side next to the trailer.

In order to determine the alignment of the trailer, the angle of the trailer, in particular the articulation angle of the trailer longitudinal axis with respect to the vehicle longitudinal axis, can be determined by means of one or more mechanical and/or electromechanical devices for measuring angles, which are arranged in a trailer coupling of the vehicle. Such devices are generally known to the person skilled in the art, for example from DE 10 2005 045 195 A1.

Alternatively or in addition, the means for determining the alignment of the trailer can also be electronic-image processing devices which are configured, for example, to determine the angle of the trailer by means of image processing of the image data which is generated by means of the image capturing device. Methods for determining the angle of a trailer by means of image processing, in particular the articulation angle of the trailer longitudinal axis with respect to the vehicle longitudinal axis, are generally known to the person skilled in the art, for example from DE 10 2011 113 197 A1.

The device according to the invention is used for detecting and reproducing a lateral surrounding area of a vehicle and, in particular, helps a vehicle driver to monitor the relevant surrounding area. The device is preferably configured to carry out the previously described method.

To this end, the device comprises at least one image capturing device which is configured to detect the relevant surrounding area and to produce image data of the surrounding area. The at least one image capturing device is, for example, a camera which is arranged in the exterior area of the vehicle and which is aligned to the corresponding surrounding area.

The device according to the invention additionally comprises at least one image reproducing device which is arranged in the field of vision of the vehicle driver and which is configured to reproduce the image data which is generated by the image capturing device. The at least one image reproducing device is preferably an electronic display and/or a display screen which is/are arranged in the inside of the vehicle, for example on the left or right side in the area of the A-pillar.

The at least one image capturing device and the at least one image reproducing device can be connected to one another via a wireless or wired data connection, in particular for transmitting the image data from the image capturing device to the image reproducing device.

The device according to an embodiment of the invention also comprises means which are configured to adapt an image section represented during the reproduction of the image data. In particular, the reproduction of the image data means the representation of the image data on the image reproducing device. The means for adapting the represented image section can, in particular, be electronic image processing devices which are integrated into the image capturing and/or image reproducing device. The means for adapting the image section represented during the reproduction of the image data can, in particular, also be configured as an additional control unit (ECU) and can be interposed between the image capturing device and the image reproducing device. In particular, when using the device according to the invention for monitoring both the left and the right surrounding areas of the vehicle and when image capturing devices are arranged both on the left and on the right sides of the vehicle, the image data which is generated by the image capturing devices can be processed by means of jointly used image processing devices. To this end, the image capturing devices can be connected to the same electronic image processing devices, for example to a central control unit (ECU).

According to a further embodiment feature of the invention, the device also comprises means which are configured to determine an alignment of a trailer of the vehicle. The means for determining the alignment of the trailer can, for example, be one or more known mechanical and/or electro-mechanical devices for measuring angles, which are arranged in a trailer coupling of the vehicle, and/or electronic image processing devices which are configured to determine the angle of the trailer, e.g. by means of known image processing methods of the image data which is generated by means of the image capturing device.

According to an embodiment of the invention, the image section of the surrounding area represented during the reproduction of the image data can be adapted as a function of the determined alignment of the trailer.

According to a preferred embodiment of the device according to the invention, the means for adapting the represented image section of the surrounding area are configured such that a represented image ratio is adapted as a function of the alignment of the trailer.

According to another preferred embodiment of the device according to the invention, the means for adapting the represented image section of the surrounding area are configured such that an image resolution is adapted as a function of the alignment of the trailer.

According to another preferred embodiment of the device according to the invention, the means for adapting the image section represented during the reproduction of the image data are configured, in particular when a reversing manoeuver is detected, such that the trailer and/or a rear end of the trailer in the represented image section is/are only located in a defined edge area. The means for adapting the represented image section are preferably configured such that the image ratio is increased if reversing is detected.

In addition, the invention relates to a vehicle in which a device according to one of the previously described embodiments is arranged.

BRIEF DESCRIPTION OF THE DRAWINGS

Additional advantages as well as optional embodiments are set out in the embodiment examples described below and the associated drawings. The embodiment examples are illustrated in a simplified manner in the drawings and explained in more detail in the following description.

DETAILED DESCRIPTION OF EXAMPLE EMBODIMENTS OF THE INVENTION

Figure 1:
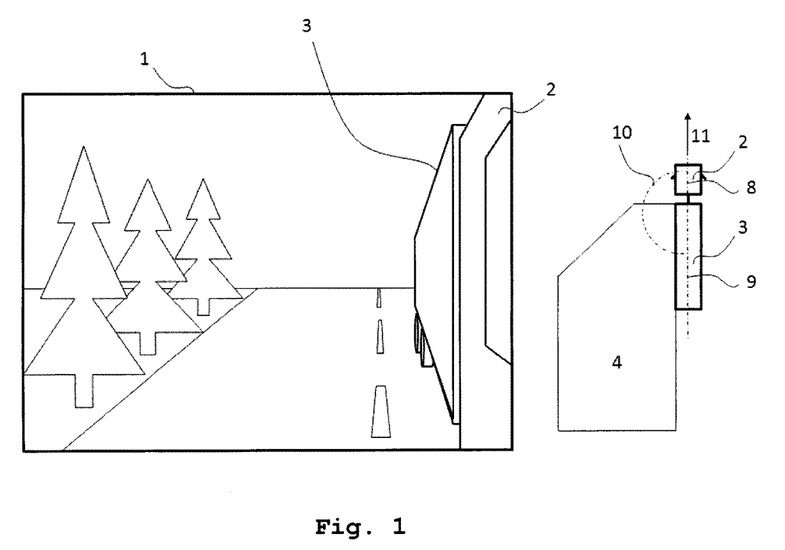
FIG. 1 is a simplified schematic illustration of the image section being reproduced on a display unit, and a schematic top view diagram of the corresponding straight driving position of a truck and its trailer.
Figure 2:
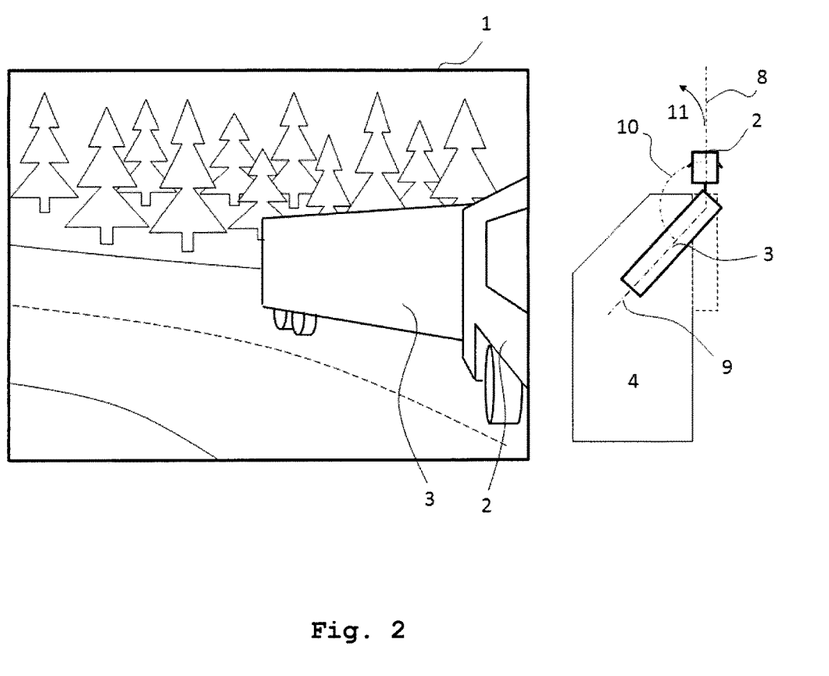
FIG. 2 is similar to FIG. 1 but shows the situation for a turning maneuver.
Figure 3:
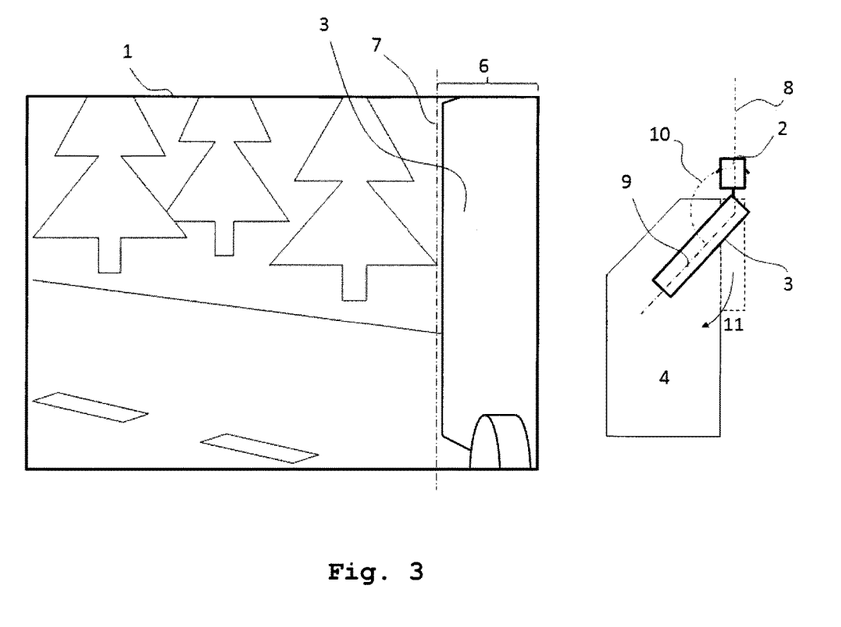
FIG. 3 is similar to FIG. 1 but shows the situation for a reversing and turning maneuver wherein the displayed image section has been adapted according to an embodiment of the invention.

FIGS. 1 to 3 show the operating principle of the method according to the invention diagrammatically. The figures respectively show the reproduction of an image section 1 of the lateral, rear surrounding area 4 of a vehicle 2 for a different driving direction 11 and different alignment of a trailer 3 arranged on the vehicle 2. In this case, the vehicle 2 is a truck with a trailer 3 and the detected and reproduced surrounding area 4 is the lateral and rear vehicle surroundings located on the left side of the vehicle 2.

According to the invention, the represented and/or reproduced image section 1 is an image section of the vehicle surroundings selected from image data, wherein the image data is detected and/or reproduced by means of at least one image capturing device arranged on the vehicle 2. The image capturing device, in particular a camera, can, for example, be arranged and aligned on the vehicle 2 such that the same covers a particular surrounding area 4 on the left side adjacent to the vehicle 2. According to the invention, more than just one image capturing device can also be arranged on the vehicle 2 to detect the relevant surrounding area 4 and to produce image data of the surrounding area 4.

The image data and/or the image section 1 is/are reproduced according to the invention by means of at least one image reproducing device which is arranged, for example, in the inside of the vehicle and in the field of vision of the vehicle driver. The image capturing device can thereby be directly connected to the image reproducing device, or additional image processing electronic devices can be interposed between the image capturing device and the image reproducing device, in particular image processing devices, which are configured to adapt the image section 1 represented on the at least one image reproducing device according to the invention.

According to the invention, during the reproduction of the image data which is generated by the one or more image capturing devices, the represented image section 1 is adapted as a function of a determined alignment of the trailer 3 of the vehicle 2.

The alignment of the trailer 3 can, in particular, mean the position and/or the location of the trailer 3 relative to the vehicle 2. The alignment can, for example, be determined on the basis of the angle 10 of the longitudinal axis 9 of the trailer 3 with respect to the longitudinal axis 8 of the vehicle 2, in particular based on the articulation angle 10 of the axes 8, 9 to one another. In addition, the alignment of the trailer 3, in particular when the angle 10 of the longitudinal axes 8, 9 to one another is known and/or determined, can also be determined on the basis of a known length and/or width of the trailer 3.

The represented image section 1 is thereby adapted as a function of the determined alignment of the trailer 3, preferably such that the vehicle surroundings in the image section 1 represented during the reproduction of the image data is not obscured or is obscured as little as possible by the trailer 3 and/or that it is possible for the vehicle driver to monitor the surrounding area 4 at all times, even with different alignments of the trailer 3.

According to the invention, a represented image ratio can be modified during the adaptation of the represented image section 1 as a function of the determined alignment of the trailer 3. The modification of the image ratio of a digital image is known to also be referred to as a zoom function. Within the framework of the invention, the image ratio can thereby be modified such that, depending on the determined alignment of the trailer 3, it is possible to zoom into the overall image and/or into the image section 1 and/or out of the image, i.e. the image ratio and/or zoom factor is increased and/or decreased, in order to obtain as good a representation as possible of the vehicle surroundings in each case and to therefore enable the vehicle driver to monitor the surrounding area 4.

In addition, within the framework of the invention, the image resolution can be modified during the adaptation of the represented image section 1 as a function of the determined alignment of the trailer 3. The image resolution can thereby, in particular, already be adapted and/or modified during the production of the image data by means of the at least one image capturing device and/or during the reproduction of the image data and/or the selected image section 1 by means of the at least one image reproducing device. Within the framework of the invention, the image resolution can thereby be modified such that, depending on the determined alignment of the trailer 3, the image resolution is increased and/or reduced, in order to obtain as good a representation of the vehicle surroundings as possible in each case and to thus enable the vehicle driver to monitor the surrounding area 4. The image resolution can thereby be adapted in particular to the altered image ratio during the adaptation of the represented image section 1.

FIGS. 1 to 3 illustrate, by way of example, the method according to the invention of adapting the represented image section 1 as a function of the alignment of the trailer 3 of the vehicle 2.

In FIG. 1, for example, when travelling straight 11, the trailer 3 is aligned to the vehicle 2 in such a way that the angle 10 between the vehicle longitudinal axis 8 and the trailer longitudinal axis 9, i.e. the articulation angle 10 of the axes 8, 9 measured about their pivot point, is 180°. The image section 1 is, in this case, adapted and/or selected such that the represented image section 1 essentially corresponds to the view of the vehicle surroundings, which a vehicle driver obtains via the side mirrors which have been used to date as standard on vehicles, in particular such that a part of the vehicle 2 and of the trailer 3 is only visible at the edge of the image section 1 and that the vehicle driver would otherwise have a view of the neighboring lane.

In FIG. 2, for example during a turning manoeuver and/or when cornering 11, the vehicle 2 is making a left turn, as a result of which the alignment of the trailer 3 to the vehicle 2 is modified compared to travelling straight in FIG. 1. In the case shown, the articulation angle 10 between the vehicle longitudinal axis 8 and the trailer longitudinal axis 9 is approximately 135°. If the image section 1 represented during the reproduction of the image data were not to be adapted to this modified alignment of the trailer 3, the vehicle driver's view of the surrounding area 4 of the vehicle 2 would be largely obscured by the front side of the trailer 3 in the represented image section 1. According to the invention the represented image section 1 is therefore adapted as a function of the determined alignment of the trailer 3, as shown in FIG. 2. In this case, the image ratio is reduced compared to the representation in FIG. 1, i.e. it is zoomed out from the image. As a result, the vehicle surroundings, in particular the detected surrounding area 4, are better visible to the vehicle driver. Within the framework of the method according to the invention it is, in particular, possible for the image ratio and/or the zoom factor to be increasingly reduced as the curve radius becomes increasingly tight, i.e. as the articulation angle 10 becomes smaller. In addition, the image resolution of the representation can be modified accordingly.

FIG. 3 shows a particular embodiment of the method according to the invention when reversing 11 is detected, for example during maneuvering or a parking manoeuver. In this case, the vehicle 2 is reversing in a left curve 11, as a result of which the alignment of the trailer 3 to the vehicle 2 is modified compared to traveling straight (FIG. 1). In the case illustrated in FIG. 3, the articulation angle 10 between the vehicle longitudinal axis 8 and the trailer longitudinal axis 9 is approximately 135°. According to the invention, in this case, i.e. when reversing 11 is detected and as a function of the angle 10, the image ratio can be increased and the represented image section 1 can be adapted such that the trailer 3 and/or the rear end 5 of the trailer 3 is/are preferably only displayed in the defined edge area 6 of the represented image section 1. The image section 1 is therefore selected such that the trailer 3 and/or the rear end 5 of the trailer is/are only located in the defined edge area 6 of the entire image section 1. This adaptation can, on the one hand, be achieved by the adaptation of the image ratio already described and, on the other hand, as a result of the fact that the entire detected image of the surrounding area 4 is not displayed, but that only a particular image section 1 is selected from the captured image data. This particular embodiment of the method according to the invention is particularly useful in that, when reversing 11, for example during parking or reversing manoeuvers, the vehicle driver is provided with a representation of the surrounding area 4 which is aligned to the rear end 5 of the trailer 3, so that he can better detect objects and/or obstacles which are located in the immediate vicinity of the trailer 3, and can better estimate the distance of the objects from the trailer 3 when maneuvering.

Within the framework of the invention, provision is in particular made for the alignment of the trailer 3 to the vehicle 2, in particular the articulation angle 10 thereof, to be detected directly by means of image processing. The trailer 3 of the vehicle 2 can be directly detected in the image by means of image processing of the image data which is generated by means of the at least one image capturing device and, in the event of a modification in the alignment and/or position of the trailer 3 in the image being determined, the represented image section 1 can be directly and automatically adapted to the modified alignment of the trailer 3 thus determined. It can in addition be provided that the rear end 5 of the trailer 3 is determined by means of image processing and the represented image section 1 is continuously adapted such that, as shown in the example in accordance with FIG. 2, the vehicle surroundings in the represented image section 1 are not obscured by the vehicle trailer 3 and/or that, as shown in FIG. 3, the rear end 5 of the trailer 3 is, for example, always only visible in a defined area 6 of the image section 1 and/or that the trailer 3 only protrudes into the display and/or reproduction of the surrounding area 4 at most up to a defined limit 7 of the edge area 6.

LIST OF REFERENCE NUMERALS

1 Image section
2 Vehicle
3 Trailer
4 Surrounding area
5 Rear end of the trailer
6 Edge area
7 Limit of the edge area
8 Vehicle longitudinal axis
9 Trailer longitudinal axis
10 Articulation angle
11 Direction of travel

The invention claimed is:

1. A method for a mirror-replacement system of a vehicle with a trailer, for reproducing an image of a lateral and/or rear surrounding area of the vehicle and the trailer, to enable a vehicle driver of the vehicle to monitor the surrounding area, wherein the method comprises:
   with at least one image capturing device of the mirror-replacement system, capturing an initial image of the surrounding area and the trailer, and producing corresponding image data,
   obtaining alignment data regarding an alignment of the trailer relative to the vehicle,
   reproducing at least some of the image data to display at least a represented image section of the surrounding area and the trailer on at least one image reproducing device of the mirror-replacement system which is arranged in a field of vision of the vehicle driver, and
   during the reproducing of the image data, adapting at least one characteristic feature of at least the represented image section of the surrounding area and the trailer dependent on the alignment data regarding the alignment of the trailer relative to the vehicle so that the trailer or at least a rear end of the trailer is displayed only in a defined edge area of the represented image section on the at least one image reproducing device.

2. The method according to claim 1, wherein the at least one characteristic feature comprises a represented image ratio of the represented image section which is adapted dependent on the alignment data.

3. The method according to claim 1, wherein the at least one characteristic feature comprises an image resolution of the represented image section which is adapted dependent on the alignment data.

4. The method according to claim 1, wherein the obtaining of the alignment data regarding the alignment of the trailer comprises determining the alignment and producing the alignment data with one or more mechanical and/or electromechanical angle measuring devices which are arranged in a trailer coupling of the vehicle.

5. A mirror-replacement system for a vehicle with a trailer, for capturing and reproducing an image of a lateral and/or rear surrounding area of the vehicle and the trailer, to enable a vehicle driver of the vehicle to monitor the surrounding area, wherein the mirror-replacement system comprises:
   at least one image capturing device which is configured and arranged to detect the surrounding area and the trailer, and to produce corresponding image data,
   at least one image reproducing device which is arranged in a field of vision of the vehicle driver and is configured and arranged to receive and to reproduce at least some of the image data to display at least a represented image section of the surrounding area and the trailer on the at least one image reproducing device,
   an input configured and arranged to receive alignment data regarding an alignment of the trailer relative to the vehicle, and
   one or more image processing devices which are configured and arranged to adapt at least one characteristic feature of at least the represented image section dependent on the alignment data regarding the alignment of the trailer relative to the vehicle so that the trailer or at least a rear end of the trailer is displayed only in a defined edge area of the represented image section on the at least one image reproducing device.

6. The mirror-replacement system according to claim 5, wherein the one or more image processing devices are configured so that the at least one characteristic feature comprises a represented image ratio of the represented image section which is adapted by the one or more image processing devices dependent on the alignment data.

7. The mirror-replacement system according to claim 5, wherein the one or more image processing devices are configured so that the at least one characteristic feature comprises an image resolution of the represented image section which is adapted by the one or more image processing devices dependent on the alignment data.

8. The mirror-replacement system according to claim 5, further comprising one or more mechanical and/or electromechanical angle measuring devices which are arranged in a trailer coupling of the vehicle, and which are configured and arranged to produce the alignment data and to transmit the alignment data to the input.

9. The device mirror-replacement system according to claim 5, further comprising electronic image processing devices which are configured and arranged to produce the alignment data by image processing of the image data, and which are configured and arranged to transmit the alignment data to the input.

10. A vehicle comprising a mirror-replacement system according to claim 5 arranged in and/or on a vehicle body.

11. The mirror-replacement system according to claim 5, further comprising an angle determination device configured and arranged to produce the alignment data regarding the alignment of the trailer and to transmit the alignment data to the input.

12. The method according to claim 1, wherein the obtaining of the alignment data regarding the alignment of the trailer comprises determining the alignment and producing the alignment data.

13. The method according to claim 1, wherein the obtaining of the alignment data regarding the alignment of the trailer comprises determining the alignment and producing the alignment data by performing image processing of the image data produced by the at least one image capturing device.

14. The method according to claim 1, wherein the adapting of the at least one characteristic feature of at least the represented image section comprises selecting a portion of the initial image to be displayed as the represented image section.

15. The method according to claim 1, wherein the adapting comprises altering the at least one characteristic feature of at least the represented image section dependent on the alignment data.

16. The vehicle according to claim 10, wherein the vehicle includes no side-mounted exterior mirrors.

17. The method according to claim 1, wherein the represented image section is reproduced on one of the at least one image reproducing device to correspond to a rear-view from a position on a side of the vehicle at which one of the at least one image capturing device is mounted.

18. The method according to claim 1, wherein the at least one characteristic feature of the represented image section is adapted so that a remainder of the represented image section other than the defined edge area displays a portion of the surrounding area that is not obscured by the trailer, and the trailer protrudes into the represented image section at most up to a defined limit that bounds the defined edge area from the remainder of the represented image section.

19. A method for a mirror-replacement system of a vehicle with a trailer, for reproducing an image of a lateral and/or rear surrounding area of the vehicle and the trailer, to enable a vehicle driver of the vehicle to monitor the surrounding area, wherein the method comprises:
   with at least one image capturing device of the mirror-replacement system, capturing an initial image of the surrounding area and the trailer, and producing corresponding image data,
   obtaining alignment data regarding an alignment of the trailer relative to the vehicle,
   reproducing some of the image data to display a represented image section of the surrounding area and the trailer on at least one image reproducing device of the mirror-replacement system which is arranged in a field of vision of the vehicle driver, and
   dependent on the alignment data, selecting a particular portion of the initial image to be displayed as the represented image section during the reproducing of the image data and/or altering an image zoom ratio of the represented image section during the reproducing of the image data, so that the trailer is always displayed only in a predefined edge area of the represented image section and a remainder of the represented image section other than the predefined edge area always displays a portion of the surrounding area that is not obscured by the trailer.

* * * * *

UNITED STATES PATENT AND TRADEMARK OFFICE
CERTIFICATE OF CORRECTION

PATENT NO. : 10,000,155 B2  
APPLICATION NO. : 14/906329  
DATED : June 19, 2018  
INVENTOR(S) : Joerg Schrepfer Page 1 of 1

It is certified that error appears in the above-identified patent and that said Letters Patent is hereby corrected as shown below:

On the Title Page

Page 2
Item [56], References Cited, first column, third line from the bottom, replace "Brandi" with --Brandl--;

In the Specification

Column 4,
Line 44, after "degrees", delete ")";

Column 5,
Line 39, after "in", replace "Which" with --which--;
Line 53, after "be", replace "electronic-image" with --electronic image--;

In the Claims

Column 11,
Claim 9, Line 56, after "The", delete "device".

Signed and Sealed this
Twenty-ninth Day of January, 2019

Andrei Iancu
*Director of the United States Patent and Trademark Office*